United States Patent
Schroeder

(10) Patent No.: US 6,391,272 B1
(45) Date of Patent: May 21, 2002

(54) METHOD FOR EXHAUST GAS DECONTAMINATION

(76) Inventor: Werner Schroeder, Beckedorfer Strasse 1, D-31542 Bad Nenndorf (DE)

(*) Notice: Subject to any disclaimer, the term of this patent is extended or adjusted under 35 U.S.C. 154(b) by 0 days.

(21) Appl. No.: 09/609,060

(22) Filed: Jun. 30, 2000

Related U.S. Application Data

(63) Continuation of application No. 08/759,525, filed on Dec. 5, 1996, now abandoned.

(30) Foreign Application Priority Data

Dec. 9, 1995 (DE) .......................... 195 46 061

(51) Int. Cl.[7] .......................... B01D 53/00; B01D 53/72
(52) U.S. Cl. .................. 423/245.3; 423/210; 423/219; 204/157.3; 204/168
(58) Field of Search .............................. 204/157.3, 168; 423/210, 219, 245.3

(56) References Cited

U.S. PATENT DOCUMENTS

| | | | |
|---|---|---|---|
| 4,317,044 A | 2/1982 | Vaseen | 422/186.3 |
| 4,780,277 A | 10/1988 | Tanaka | 422/4 |
| 4,941,957 A | 7/1990 | Zeff | 204/157.3 |
| 5,183,511 A | 2/1993 | Yamazaki | 118/723 |
| 5,221,520 A | 6/1993 | Cornwell | 422/122 |
| 5,230,220 A | 7/1993 | Kang | 62/78 |

(List continued on next page.)

FOREIGN PATENT DOCUMENTS

| | | | |
|---|---|---|---|
| DE | 3913968 | 11/1989 | B01D/53/00 |
| DE | 4317199 | 11/1994 | B01D/53/00 |
| DE | 4423397 | 7/1995 | D01D/53/32 |
| EP | 261 987 | 3/1988 | B01D/53/34 |
| JP | 6-91137 | 4/1994 | B01D/53/36 |
| JP | 6-205930 | 7/1994 | B01D/53/34 |
| JP | 7-60058 | 3/1995 | B01D/53/36 |
| WO | WO 91/00708 | 1/1991 | A61L/9/00 |
| WO | WO 93/19838 | 10/1993 | B01D/53/36 |

OTHER PUBLICATIONS

Derwent Database Abstract of JP 07–108138, published Apr. 25, 1995.

Derwent Database Abstract of JP 07–060058, published Mar. 7, 1995.

Darpin et al., "Photooxidation von organischen Abluft—inhaltsstoffen mit kurzweiliger UV–Strahlung". *Chem.-Ing.-Tech* 61: 548–551 (1989).

(List continued on next page.)

*Primary Examiner*—Steven P. Griffin
*Assistant Examiner*—Maribel Medina
(74) *Attorney, Agent, or Firm*—Crowell & Moring LLP

(57) ABSTRACT

A method for cleaning exhaust air containing pollutants, especially gaseous hydrocarbon emissions in an exhaust duct, using a catalyst and a UV radiation raising the energy level of the hydrocarbons, in which the exhaust air is exposed in a first section of the air duct to UV-C radiation of a wavelength of below 300 nm, preferably of about 254 nm, which causes an excitation of the hydrocarbons to higher energy levels, and also to a UV-C radiation of a wavelength preferably of about 185 nm, which additionally causes the formation of ozone, and of molecular oxygen and radicals from the ozone, while a partial oxidation of the hydrocarbon molecules takes place in the gas phase, and in that in a following second section of the air duct a catalytic oxidation of the hydrocarbon molecules is performed at the inner surface of a porous support material, the hydrocarbon molecules being absorbed, then oxidized on the active surface by the additionally formed ozone and removed from the surface of the catalyst in the form of $H_2O$ and $CO_2$ as reaction products.

6 Claims, 1 Drawing Sheet

U.S. PATENT DOCUMENTS

| | | |
|---|---|---|
| 5,254,512 A | 10/1993 | Ueda .......................... 502/52 |
| 5,294,315 A | 3/1994 | Cooper .................... 204/158.2 |
| 5,348,665 A | 9/1994 | Schulte ...................... 210/748 |
| 5,447,693 A * | 9/1995 | Ohta et al. .................. 422/122 |
| 5,463,170 A | 10/1995 | Von Wedel ................. 588/207 |
| 5,468,454 A * | 11/1995 | Kim ........................... 422/121 |
| 5,676,913 A | 10/1997 | Cirillo ........................ 423/279 |

OTHER PUBLICATIONS

Friedl, "Radikale gagen Schadstoffe". *VDI–N*, Duesseldorf, Dec. 4, 1991.

Sebold et al., "Vergleich UV–Oxidation und katalytische Oxidation in der Gasphase–Moegliche Verfahrensstufen der Abluftreinigung bei Sanierungen—Kurzbericht". *Altlasten Spektrum* 199–200, Apr. 1995.

Sebold, "UV Oxidation in der Gasphase Verfahrensprinzip und Einsatzbereiche der UV–Oxidation zur Abreinigung kontaminierter Luft". *Landesanstalt fuer Umweltschutz Baden–Wuerttemberg* Nov. 1994, pp. 22,23,38,44,45.

* cited by examiner

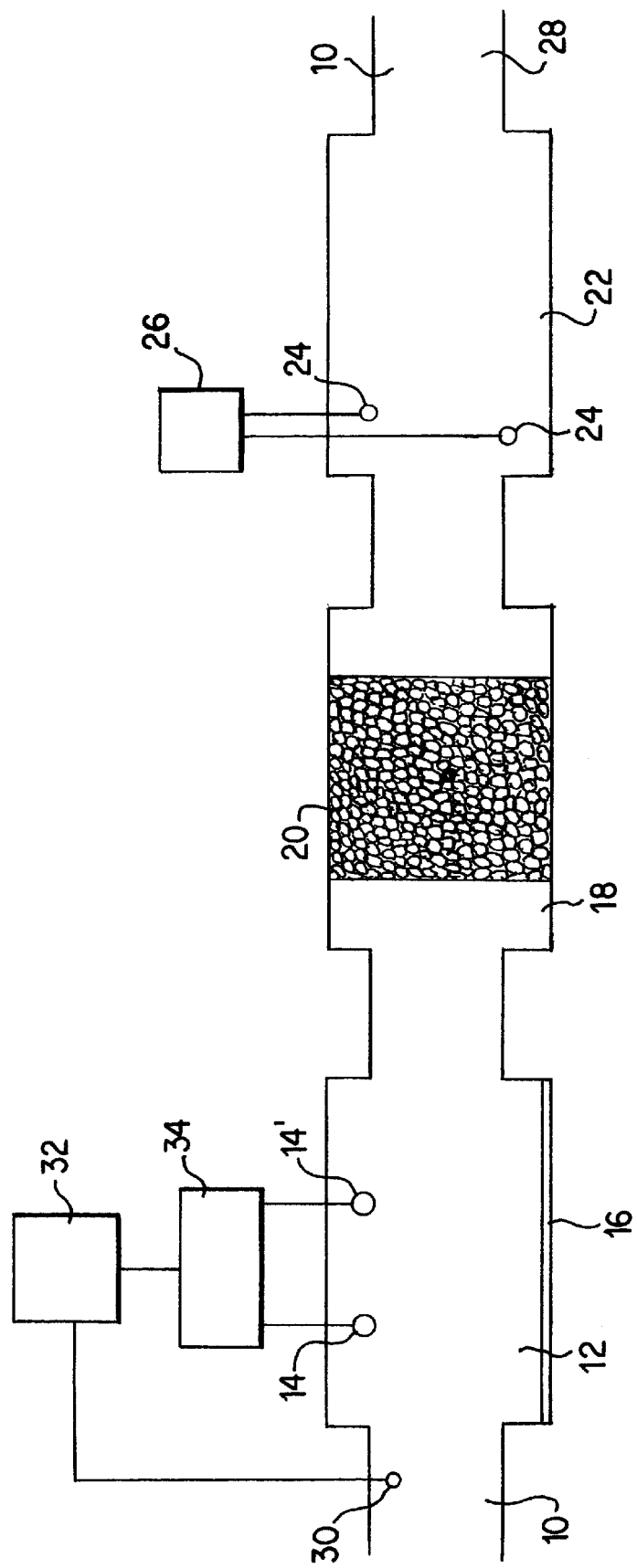

METHOD FOR EXHAUST GAS DECONTAMINATION

This application is a continuation of application Ser. No. 08/759,525, filed Dec. 5, 1996 (abandoned).

BACKGROUND OF THE INVENTION

The invention relates to a method for cleaning exhaust air containing pollutants, especially gaseous hydrocarbon emissions in an exhaust duct, by the use of ultraviolet (UV) radiation which raises the energy level of the hydrocarbons, and by the use of a catalyst and to an apparatus for the practice of such a method.

Published German Patent Application No. DE 4,317,199 A1 discloses a method for ultraviolet excitation of pollutants with simultaneous catalytic decomposition, in which the electrochemical potential of the reactive substances is increased by means of ultraviolet radiation and an exothermal chemical process is initiated. By a special mixing technique the excited compounds are passed over a catalytically active surface while in the excited state, where they react under the direct action of the ultraviolet radiation. This method, however, has the disadvantage that nothing other than an elevation of the electrochemical potential of the reactive substances is accomplished. At the same time a direct ultraviolet catalyst is performed, making it necessary to expose the entire active surface of the catalyst to the ultraviolet radiation. The result is that only a very small catalyst surface is available, so that for this reason alone the efficiency of the method is greatly limited. It is not possible to increase the throughput of the process by adding an additional catalyst chamber at the outlet.

U.S. Pat. No. 5,463,170 (=DE 4,305,344) describes the decomposition of highly toxic halogenated compounded contained in gases by means of oxidation, using hydrogen peroxide. This document also discloses that PCDD's and PCDF's can be decomposed by treating the gases with hydrogen peroxide with simultaneous exposure to ultraviolet light. Also, the gas is passed, in the presence of hydrogen peroxide, over a substantially inorganic solid catalyst, especially Pyrogene or precipitated silicic acid or aluminum silicate. Although the pollutant content can be considerably reduced in this manner, it is a disadvantage that the apparatus cost is very high and can only be justified when there is a need to remove highly concentrated and highly toxic pollutants.

Published German Patent Application No. DE 4,423,397 A1 also discloses a method and an apparatus for cleaning exhaust gases, in which the gases are exposed simultaneously to an electrical gas discharge between electrodes and to contact with catalytic material so that a catalytic oxidation is performed. Here, again, simultaneity greatly limits the efficiency of the process.

SUMMARY OF THE INVENTION

It is an object of the invention to provide a method and an apparatus for cleaning exhaust air which will be distinguished by simple construction.

It is a further object of the invention to provide a method and apparatus for cleaning exhaust air which has a low energy input requirement.

These and other objects have been achieved in accordance with the present invention by providing a method for decontaminating air which contains oxidizable pollutants, comprising the steps of exposing the pollutant-containing air in a first zone to UV-C radiation having a first wavelength under 300 nm which excites pollutant molecules to higher energy levels and increases their reactivity, and a second wavelength of about 185 nm which promotes the formation of ozone, the ozone decomposing to molecular oxygen and oxygen radicals which in turn effect at least partial gas phase oxidation of the pollutants; and thereafter subjecting air from the first zone to a catalytic oxidation treatment on an oxidation catalyst in a subsequent second zone wherein pollutant molecules are adsorbed on an active surface of the catalyst and oxidized to harmless reaction products, which in turn are released into the treated air.

In accordance with a further aspect, the objects of the invention are achieved by providing an apparatus for decontaminating air which contains oxidizable pollutants, comprising a first reaction zone through which air to be treated may be passed, the first reaction zone containing at least one UV radiator which emits UV-C radiation having a first wavelength under 300 nm which excites pollutant molecules to higher energy levels and increases their reactivity, and a second wavelength of about 185 nm which promotes the formation of ozone, and a second reaction zone in communication with an outlet of the first reaction zone and containing an oxidation catalyst which promotes catalytic oxidation of pollutant molecules.

In some preferred embodiments of the invention the first reaction zone is provided with a reflective surface for reflecting the UV radiation; the second reaction zone is followed by a third reaction zone containing at least one corona discharge electrode for ionizing the exhaust gas; and the exhaust duct is provided with a sensor and regulator for adjusting the UV radiation to an optimum level.

Since the exhaust air is subjected in the first section of the air duct to UV-C radiation having a wavelength of less than 300 nm, preferably about 254 nm, which causes an excitation of the hydrocarbons to higher energy levels, and furthermore to UV-C radiation having a wavelength of preferably about 185 nm, which additionally causes the formation of ozone, and of molecular oxygen and radicals from the ozone, whereby a partial oxidation of the hydrocarbon molecules takes place in the gas phase, and since in an adjoining second section of the air duct a catalytic oxidation of the hydrocarbon molecules is carried out on the inside surface of a catalyst formed of porous support material, in which the hydrocarbon molecules are adsorbed, then oxidized on the active surface by the additionally formed ozone and removed from the surface of the catalyst in the form of $H_2O$ and $CO_2$ as reaction products, a very effective catalytic oxidation of the pollutants has surprisingly been achieved even at room temperature.

Basically, the UV-C radiation having a wavelength of preferably about 185 nm in the first section of the air duct causes the formation of large amounts of ozone which is available as reactant, and which additionally leads in the second section to a very advantageous, intensified catalytic oxidation of the hydrocarbons. Thus, high concentrations of hydrocarbons can be decomposed therein. Simultaneously, however, excess ozone is decomposed to molecular oxygen on the surface of the catalyst. In an entirely surprising manner, the excess ozone produced consequently does not cause any of the environmental harm that might have been expected.

The method of the invention is furthermore distinguished by the fact that, at throughputs between 1,000 and 10,000 $m^3/h$, comparatively simple means permit the achievement of a high degree of purification, and the pollutants are disposed of as reaction products in the form of $H_2O$ and $CO_2$. Conventional methods for comparable throughputs are decidedly more complicated and expensive.

According to one preferred embodiment of the method, UV radiation having wavelengths of 185 nm and 254 nm is used. The 185 nm wavelength serves mainly to produce ozone. The 254 nm wavelength serves primarily to excite the hydrocarbons. By such an arrangement of the UV radiation it is possible to produce both of these effects in an extremely effective manner. If desired, an additional intensification of the formation of ozone can be achieved by ionization with corona discharges additionally produced especially in the first section of the air duct.

Especially if the cleaned exhaust air is to be delivered as an air supply to interior spaces, it has been found advantageous if the exhaust air additionally is ionized in a subsequent, third section of the apparatus. By enriching the air with oxygen ions in this way, it is possible to improve the quality of the air, especially air for breathing.

It is furthermore envisioned that the catalytic oxidation preferably is performed by active carbon. The advantage is that the active carbon can be reactivated inexpensively. Furthermore, active carbon can be used very cheaply. In this connection it must be mentioned that the method of the invention is characterized especially also by the fact that the hydrocarbon molecules adsorbed on the active surface of the catalyst, i.e., on the active carbon in this case, are oxidized, i.e., constantly removed, by the ozone oxidizer, and are decomposed to water and carbon dioxide, which then escape to the environment as harmless components.

In one embodiment of the apparatus of the invention, at least one UV radiator which emit a wavelength of preferably 254 nm and a wavelength of preferably 185 nm is disposed in a first section of an exhaust duct, and a catalyst formed of porous support material is arranged in a second section of the exhaust duct.

The overall intensity of the UV radiation can be increased by providing the first section of the exhaust duct with reflective surfaces in the area of the UV radiation. The catalyst used within the scope of the invention preferably consists of active carbon. Alternatively, however, it is possible to use a catalyst comprising a coating of catalytically active metal oxides provided on a support material such as active carbon, pumice, zeolites and/or clay. Examples of suitable catalytically active metal oxides include oxides of Mn, Fe, Co, Ni, Zn, Si, Ti and/or Zr. It is also possible within the scope of the invention to use the noble metals Pt, Pd or Rd as a catalytic coating. In some cases it is also possible for the catalytically active coatings to comprise mixtures of one or more of the aforementioned metal oxides with one or more of the aforementioned noble metals.

If desired, the apparatus can be provided with a regulating system comprising at least one sensor disposed in the air duct which detects the pollutants or measures their concentration in the air within the duct and controls the intensity of the ultraviolet radiation and/or ionization in response to the measured value, thereby regulating the intensity of the oxidation. It will thus be possible to operate the apparatus of the invention in a very energy-saving manner, in which the energy consumption can be adapted precisely to the particular requirements. Lastly, by operating the apparatus in this manner the useful service life of the catalyst and that of the ionization tubes or UV radiators can be lengthened, so that here, again, a cost saving is realized.

The UV-C radiation of different wavelengths that is used according to the invention is also capable of decomposing even greater hydrocarbon concentrations in the range of several hundred $mg/m^3$ total hydrocarbon content. This results, on the one hand, in the effect that due to the use of radiation having a wavelength of less than 300 nm, preferably about 254 nm, an excitation of the hydrocarbons to a higher energy level is achieved. At the same time a greater amount of ozone is produced, which is caused especially by a content of a wavelength of 185 nm. This results in the effect that the hydrocarbons excited to a higher energy level react, i.e., are oxidized, very much faster by the radicals. The ozone breaks down into molecular oxygen and radicals, with the radicals producing an at least partial oxidation of the hydrocarbon molecules of the exhaust air. The increased ozone content likewise accelerates the oxidation of the hydrocarbon molecules, in which case the total content of the hydrocarbon molecules can be higher, in accordance with the higher ozone content.

In the following second section of the air duct, a catalytic oxidation of the hydrocarbon molecules in the exhaust air takes place on the surface of the catalyst. The hydrocarbon molecules attach themselves to the surface of the catalyst. At the same time the incoming ozone is broken down on the surface of the catalyst with the formation of oxygen molecules and radicals. The radicals then produce the oxidation, i.e., the decomposition, of the hydrocarbon molecules deposited on the surface of the catalyst. By means of the catalyst a positive combining of the hydrocarbon molecules with the ozone is achieved, so that the oxidation of the hydrocarbons takes place spontaneously. The arrangement of the catalyst thus assures that the hydrocarbon molecules can be converted to a very great extent to water and $CO_2$. It is especially surprising that this process takes place at room temperature without any additional energy input.

Furthermore, the excess ozone is decomposed to molecular oxygen ($O_2$) at the surface of the catalyst. The excess ozone thus causes no environmental harm whatsoever. All told, the process used according to the invention is very environmentally safe. Especially if an ionization follows, it is even possible to feed cleaned exhaust air to interior spaces. The final ionization causes enrichment with oxygen ions, resulting in another decomposition of residual molecules in the supplied air as well as in the interior spaces.

BRIEF DESCRIPTION OF THE DRAWING

The invention will be described in further detail hereinafter with reference to an illustrative preferred embodiment shown in the accompanying drawing in which:

The FIGURE is a schematic illustration of an apparatus for carrying out the invention.

DETAILED DESCRIPTION OF A PREFERRED EMBODIMENT

In the drawing, reference numeral 10 identifies an air exhaust duct for exhausting air contaminated with, for example, gaseous hydrocarbon emissions. In a first reaction zone or chamber 12 on duct 10, there are a plurality of ultraviolet radiators 14, 14'. The first radiator 14 emits UV radiation having a wavelength of less than 300 nm, preferably about 254 nm, which excites hydrocarbon pollutant molecules in the exhaust air to higher energy levels which increases their reactivity. The second radiator 14' emits UV radiation having a wavelength of about 185 nm which promotes the formation of ozone from molecular oxygen. Reaction zone 12 is provided with an optional reflective coating 16 which reflects the UV radiation and serves to increase the intensity of the radiation exposure.

Exhaust air leaving the first reaction zone 12 passes into a second reaction zone or chamber 18 which contains a porous bed of an oxidation catalyst 20, preferably a bed of activated carbon. The hydrocarbon pollutants are adsorbed on the catalyst and the excited pollutant molecules are catalytically oxidized to harmless substances (e.g., $H_2O$ and $CO_2$ in the case of hydrocarbon pollutants) which are then released back into the exhaust air stream.

From reaction zone 18, the exhaust air continues on through duct 10 to a third reaction zone or chamber 22. Reaction zone 22 contains at least one corona discharge electrode 24 connected to a suitable power supply 26 for ionizing the exhaust air to improve the air quality by enriching the air with oxygen ions. The exhaust air then continues on to outlet 28 of exhaust duct 10.

Exhaust duct 20 is also provided with an optional pollutant sensor 30, which may be a conventional hydrocarbon sensor, for measuring the pollutant level in the exhaust air. The output of sensor 30 is communicated to a regulator 32, which in turn adjusts the power supply 34 of UV radiators 14, 14' to match the output of the radiators to the hydrocarbon concentration in the exhaust air stream for optimum operating efficiency and pollutant removal. If desired, regulator 32 may function by switching on a greater or lesser number of UV radiators in first reaction zone 12.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for decontaminating pollutant-containing exhaust air which contains gaseous hydrocarbon emissions, comprising the steps of:

guiding the exhaust air through an air exhaust duct at a flow rate of between 1,000 and 10,000 $m^3/h$;

exposing the exhaust air in a first zone of the air exhaust duct to UV-C radiation which raises the energy level of the hydrocarbons, and partially oxidizing hydrocarbon molecules in the gas phase, wherein the UV-C radiation has a wavelength under 300 nm which excites the hydrocarbons to higher energy levels, and the UV-C radiation additionally has a wavelength of about 185 nm which promotes formation of ozone, molecular oxygen and oxygen radicals; and providing a catalyst having an active surface in a subsequent, second zone of the air exhaust duct, and catalytically oxidizing hydrocarbon molecules by adsorbing the molecules on the active surface of the catalyst, oxidizing the adsorbed molecules on the active surface with excess ozone, molecular oxygen or oxygen radicals, and removing oxidized hydrocarbons from the surface of the catalyst as reaction products in the form of $H_2O$ and $CO_2$.

2. A method according to claim 1, wherein the UV-C radiation used to excite the hydrocarbons to higher energy levels in the first zone of the air exhaust duct has a wavelength of about 254 nm.

3. A method according to claim 1, further comprising ionizing the exhaust air in the air exhaust duct by corona discharge.

4. A method according to claim 1, wherein the catalytic oxidation is carried out using catalytic active carbon.

5. A method according to claim 1, wherein the catalytic oxidation is carried out on a layer of catalytic metal oxides on a carrier material formed from active carbon, pumice, zeolites or clay.

6. A method according to claim 1, further comprising ionizing the exhaust air in a subsequent, third zone of the air exhaust duct.

* * * * *